United States Patent [19]

Zaromb

[11] Patent Number: 4,814,240

[45] Date of Patent: Mar. 21, 1989

[54] METAL-CONSUMING POWER GENERATION METHODS

[76] Inventor: Solomon Zaromb, 9S706 William Dr., Hinsdale, Ill. 60521

[21] Appl. No.: 88,297

[22] Filed: Aug. 24, 1987

Related U.S. Application Data

[60] Continuation of Ser. No. 799,317, Nov. 18, 1985, abandoned, which is a division of Ser. No. 482,472, Sep. 29, 1982, Pat. No. 4,554,222, which is a continuation-in-part of Ser. No. 179,274, Aug. 18, 1980, Pat. No. 4,416,954, which is a continuation-in-part of Ser. No. 704,452, Jul. 12, 1976, Pat. No. 4,305,999, and Ser. No. 20,967, Mar. 16, 1979, Pat. No. 4,218,520, and Ser. No. 80,185, Oct. 10, 1979, Pat. No. 4,254,190, and Ser. No. 238,626, Feb. 26, 1981, Pat. No. 4,369,234, which is a division of Ser. No. 80,185, Oct. 1, 1979, Pat. No. 4,254,190.

[51] Int. Cl.⁴ .............................................. H01M 8/04
[52] U.S. Cl. .................................. 429/15; 429/17; 429/23; 429/26; 429/50
[58] Field of Search ....................... 429/15, 17, 19, 26, 429/27, 23, 34, 101, 110, 113, 50, 51, 105, 14

[56] References Cited

U.S. PATENT DOCUMENTS

| | | | |
|---|---|---|---|
| 3,788,899 | 1/1974 | Zaromb | 429/26 |
| 3,981,747 | 9/1976 | Doniat et al. | 429/15 |
| 4,126,733 | 11/1978 | Doniat | 429/15 X |
| 4,150,197 | 4/1979 | Zaromb | 429/15 |
| 4,198,475 | 4/1980 | Zaromb | 429/15 |
| 4,207,382 | 6/1980 | Zaromb | 429/27 X |

Primary Examiner—Anthony Skapars

[57] ABSTRACT

A power source and related methods comprise a slurry-type reactive metal anode containing such metal as aluminum, lithium, sodium, calcium or magnesium, or alloys or mixtures of such metals, suspended in a flowing aqueous electrolyte, in conjunction with a water-consuming hydrogen-evolving cathode in an electrochemical reactor cell, so as to generate electrical power from the metal-water reaction. The hydrogen evolving from said cell may be fed to a hydrogen-consuming fuel cell or battery to yield additional electrical energy.

18 Claims, 1 Drawing Sheet

METAL-CONSUMING POWER GENERATION METHODS

This is a continuation of my application Ser. No. 06/799,317, filed Nov. 18, 1985, now abandoned, which is a divisional application of my application Ser. No. 06/482,472, filed Sept. 29, 1982, now U.S. Pat. No. 4,554,222, which is a continuation-in-part of my application Ser. No. 179,274, filed Aug. 18, 1980, now U.S. Pat. No. 4,416,954, which is a continuation-in-part of my application Ser. No. 704,452, filed July 12, 1976, now U.S. Pat. No. 4,305,999; Ser. No. 20,967, filed Mar. 16, 1979, now U.S. Pat. No. 4,218,520; Ser. No. 080,185, filed Oct. 1, 1979, now Patent No. 4,254,190; and Ser. No. 238,626, filed Feb. 26, 1981, now Pat. No. 4,369,234, which is a divisional application of Ser. No. 080,185, filed Oct. 1, 1979, now U.S. Pat. No. 4,254,190.

BACKGROUND OF THE INVENTION

This invention relates to methods and apparatus for generating electrical energy from the oxidation of reactive metals, especially of aluminum, lithium, sodium, magnesium, calcium, or their mixtures or alloys, and especially of aluminum waste and other inexpensive aluminum products.

In my copending applications, I have disclosed apparatus and methods for withdrawing electrical energy, heat, and a hydroxide reaction product from the electrochemical oxidation of aluminum, preferably in aqueous alkaline electrolytes. In particular, my last-mentioned copending application Serial No. 238,626 discusses a chemical reaction between aluminum pieces and an electrolyte yielding aluminum hydroxide and an intermediate reactant, which is in turn oxidized in an electrochemical cell so as to generate electrical energy. One of the cited intermediate reactants is hydrogen used in conjunction with a nongaseous cathode reactant. As disclosed in said last copending application, the hydrogen is generated by direct chemical reaction between the aluminum and the electrolyte.

It is the purpose of the present invention to derive useful electrical energy from the hydrogen-generating reaction between reactive metal particles and water.

It is another object of my invention to increase the overall energy yield from the electrochemical oxidation of aluminum or aluminum-containing alloys or mixtures so as to improve the over-all energy efficiency and energy density of aluminum-containing fuel, and to render the latter economically competitive with alternative fuels.

It is yet another object of my invention to provide an improved high-energy-density power source for marine applications.

It is still another object of my invention to provide an improved highenergy-density high-power-density system for the propulsion of electric vehicles and for other applications.

SUMMARY OF THE INVENTION

Briefly, my invention consists in using a slurry-type reactive metal anode, comprising a slurry of such reactive metals as aluminum, lithium, sodium, calcium or magnesium, or alloys or mixtures of such metals, suspended in a flowing aqueous electrolyte, in conjunction with a water-consuming hydrogen-evolving cathode in an electrochemical reactor cell, so as to generate electricity from a metalwater reaction. The hydrogen evolving from said cell may be fed to a hydrogenconsuming fuel cell or battery to yield additional electrical energy.

BRIEF DESCRIPTION OF THE DRAWINGS

My invention is best explained with reference to the drawings, in which.

DESCRIPTION OF THE PREFERRED EMBODIMENT

The basis of operation of an electrochemical slurry-type metal-water reactor is similar to that of the previously developed solid-anode-type of lithium-water battery, on the one hand, and of a previously disclosed slurry-type aluminum-air power source on the other hand. The lithium-water battery has been described in a number of publications, such as the following: D. D. Kemp et al., Proceedings of the 11-th Intersociety Energy Conversion Engineering Conference, Paper 769078 (1976), pages 462–466; H. J. Halberstadt et al., Proceedings of the 10-th Intersociety Energy Conversion Engineering Conference, Paper 759167 (1975), pages 1120–1125; and E. L. Littauer and K. C. Tsai, Proceedings of the 26th Power Sources Conference, 1974, pages 57–60. A slurry-type aluminum-air power source has been described in my copending U.S. application Ser. No. 179,274, filed Aug. 18, 1980, which is incorporated herein by reference.

Figure 1:
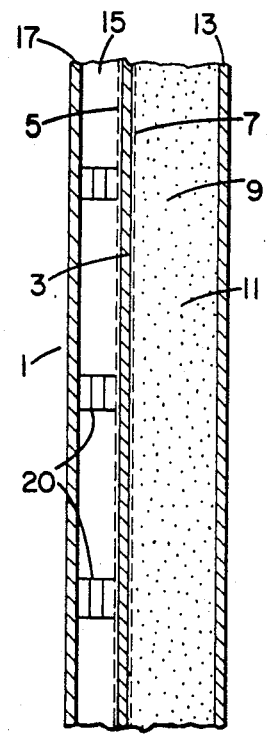
FIG. 1 is a partial schematic cross-sectional view of a single electrochemical reactor cell according to the present invention.

As shown in FIG. 1, each reactor cell 1 comprises a battery separator 3, which may be of asbestos, parchment, ion-exchange membrane, or similar material, between a cathode screen or grid 5 and an anode current collector screen 7, a reactive metal slurry 9 carried by an anolyte solution 11 between anode screen 7 and one cell wall 13, and a hydrogen chamber 15 between the cathode screen or grid 5 and a second cell wall 17 comprising a gas-permeable spacing grid 20. Each cell wall may consist of either an electrically insulating material or of an electrically conducting bipolar current collector (i.e., electrically connected to one anode and one cathode) between a series of back-to-back cells in a cell-stack. The slurry particles enter and exit through channels in the end walls (not shown) and impinge upon collector screen 7 as they are carried through cell 1. Parasitic currents through the electrolyte flowing between series-connected cells may be minimized by proper channel design, e.g., by disposing hydrogen collecting spaces 10 (FIG. 2) within the channels between successive cells.

The cathode 5 may be porous tetrafluoroethylene-backed diffusion electrode similar to those commonly used in fuel cells or metal-air batteries, i.e., comprising fine catalyst particles of high effective surface area and a currentcollecting screen bonded to each other and to a porous tetrafluoroethylene backing. The screen and catalyst side of the cathode should adhere closely to the hydrophilic separator 3 to assume good wetting of the catalyst particles by the electrolyte impregnating the separator.

To facilitate escape into chamber 15 of the hydrogen bubbles formed at the cathode 5, the cathode structure should have wide open pores. Moreover, to minimize bubble entrapment within separator 3, the latter should be highly hydrophilic, and should be preferably an ion-exchange membrane having no pores or very fine pores whose capillary forces can effectively resist entry or formation of any hydrogen bubbles.

This separator membrane can be made of inorganic-ion-exchange material, such a chrysotile asbestos, potassium hexatitanate or polyantimonic acid with a polytetrafluoroethylene binder, or organic copolymers of 4- or 2-vinylpyridine with divinylbenzene or with halogenated hydrocarbons such as tetrafluoroethylene or chlorotrifluoroethylene, or of other suitable materials.

The composition of the slurry particles 9 and of electrolyte 11 will depend on a given application. However, their major constituents appertain to the family of metals or alloys comprised of aluminum, lithium, sodium, magnesium or calcium. In one embodiment of the invention, the power source system may be represented by the block diagram of FIG. 2. This system is most suitable for the propulsion of small marine vehicles over relatively long distances. For such applications, lithium is the reactive metal of choice due to its very high energy density when reacted with water. Since water may be obtained from the surroundings, only the weight of lithium needs to be considered in evaluating the reactant energy density of the system, which is about 4 kilowatt-hours/kilogram of lithium. If the supply of reactants is to be carried outside the hull of a submerged vehicle and to have neutral buoyancy, it may be desirable to use a macroscopically homogeneous mixture of lithium and aluminum proportioned to yield an average effective density equal to that of sea-water (about 1.025 gram/milliliter), taking account of voids between particles and of any other substances which are to be used up or otherwise depleted in conjunction with the metallic reactants (e.g., inert volatile matter filling voids between the particles). Such a mixture will still yield an energy density in excess of 3 kilowatt-hours/kilograms of reactant metals. Alternatively, other reactive metals, such as sodium, magnesium or calcium may be used for some applications.

Figure 2:
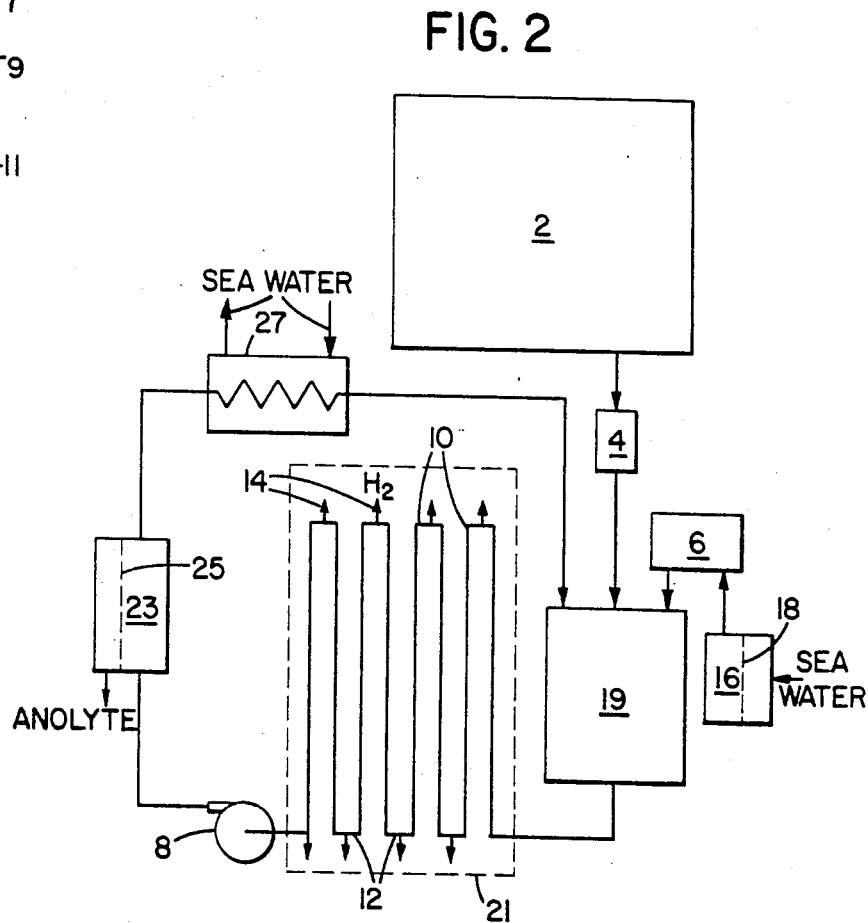
FIG. 2 is a block diagram of an electric power source comprising the cell of FIG. 1 according to one embodiment of the invention.

FIG. 2 is a block diagram of a slurry-type Li-Al/$H_2O$ power source. When power is generated and reactants are consumed, fresh Li-Al particles from reactant supply 2 and fresh sea-water from water purifier 16 are metered by metering devices 4 and 6 and fed into a slurry-mixing chamber 19 and thence into a reactor cell-stack 21 comprising a plurality of reactor cells 1. The hydrogen generated in stack 21 may be allowed to escape through hydrogen lines 10, 12 and outlets 14 into the sea or else it may be fed to a fuel cell, e.g., a $H_2/H_2O_2$ fuel cell, or a $H_2/NiO_2$ battery or a metal hydride storage device (not shown). The LiOH-Al(OH)$_3$-enriched electrolyte sucked from stack 21 by pumping means 8 may be partly rejected into the sea from an electrolyte-rejection chamber 23, comprising a slurry-retaining filter 25, and partly recirculated first through a heat-exchanger 27 and then back into mixing chamber 19.

The electrolyte circulating through the system of FIG. 2 may comprise between 2 and 5 moles/liter of LiOh plus an amount of dissolved Al(OH)$_3$ in the same molar ratio of the LiOH as the molar ratio of aluminum to lithium contained in the reactant supply 2.

The anode slurry may comprise a mixture of substantially pure Li and substantially pure Al particles or one or more alloys of Li and Al.

A simple way of preparing a macroscopically uniform mixture is by rapidly quenching a melt of the desired average composition and cutting up the resulting quenched ribbons or pellets into smaller particles for optimal performance within the reactor cells. Should the quenched particles tend to exhibit slow phase segregation at room temperature, so that each particle may comprise microscopic granules of different composition, then the ribbons or pellets must be cut up immediately after quenching, i.e., before substantial phase segregation has had a change to occur. The density of each particle will then be closed to that corresponding to the average metal composition, e.g., 1.025 gram/milliliter for an Al:Li mole ratio of about 0.38:1.

The macroscopically uniform mixture obtained by a quenching process has the advantages of substantially uniform electrochemical and hydrodynamic slurry characteristics. With the particle density close to or lower than that of the electrolyte, there is no tendency for the particles to settle by gravity. Any tendency for the particles to float can be counteracted by having the slurry in each cell flow in the downward direction.

In view of the comparatively low density of the suspended metallic particles, these could only affect the flow of the slurry if their shapes and sizes were such as to cause entanglement and clogging of any narrow passages. Provided that these shapes are not hook-like, and that the maximum particle size is sufficient for the slurry to freely clear the narrowest channels in the system, there is no reason to expect any entanglement or clogging. Then the main factors affected by shape and size are the effective surface area and the effective interparticle ohmic loss for a given average particle concentration. Another factor affected by the minimum initial dimension of these particles is their average consumption time for a given current density.

For maximum interparticle contact at a relatively low metal concentration, the particles should be preferably in form of flat flakes or chips. The average consumption time of such flakes or chips will then depend on their initial thickness. For instance, with a 30-micron thickness and a current density of 0.1 ampere/cm$^2$ of true immersed area, the average consumption time will be only about 180 seconds. Therefore, in case of a sudden interruption of current drain, only a minute fraction of the reactant supply remains in contact with electrolyte. Conversely, in case of a sudden increase in power demand, only a small amount of reactants has to be injected into the slurry to provide the additional surface area for optimal operation.

The thinner the flakes or chips used, the briefer is their consumption time and the larger is their effective surface area per unit weight. Hence the particles should be preferably as thin as is compatible with their structural integrity requirements and reasonable production costs. Typical preferred particle dimensions are 1–3 mm in length, 0.1–1 mm in width, and 10–100 microns in thickness.

The Li-Al metering device 4 may consist of a hopper (not shown) filled with reactant particles and an electrically actuated control valve (not shown) allowing a scoop (not shown) to be filled with a predetermined volume of particles. Similar devices are disclosed in my U.S. Pat. No. 4,198,475, incorporated herein by reference, and in other technical literature. The control valve may be actuated whenever the cell-stack voltage falls below a preset value and/or the power demand exceeds that which can be delivered by the reactor cells at a given moment. The particles may then be caused to drop from the scoop into slurry-mixing chamber 19, thereby enriching the slurry and increasing its active surface area per unit volume, which in turn increases the apparent density and voltage as the enriched slurry circulates through stack 21.

As indicated above, the optimum electrolyte composition comprises 2-5 M LiOH. Therefore, to maintain for instance a substantially constant 3 M LiOH concentration, each 3 moles of lithium consumed require the injection of 1 liter of fresh sea-water and the rejection of the same volume of 3 M solution.

The water purifier 16 may comprise a filtering means 18 for removing live organisms and other organic or inorganic particles, and an ion-exchange means (not shown) for removing those ionic species which may adversely affect the performance of the catalyst in cathode 5. Alternatively, a vacuum-distillation means utilizing the heat generated in cell-stack 21 may provide distilled water in a manner analogous to that disclosed in my U.S. Pat. No. 4,305,999.

The water from purifier 16 may be injected by metering device 6 simultaneously with the introduction of reactant particles and in a predetermined proportion to the amount of lithium added to the slurry. The corresponding excess of electrolyte may be expelled from the anolyte-rejection chamber 23. To prevent loss of recirculated slurry particles, chamber 23 may contain a suitable filter device 25.

During cell operation under or near optimal conditions, the polarization should amount to 0.1–0.2 volt at the cathode and 0.5–0.7 volt at the anode. In addition, there may be ohmic losses of 0.1–0.2 volt and anode corrosion losses of 0–10%. Now, a corrosion loss of 5% is equivalent to a polarization loss of about 0.1 volt in terms of effective heat generation. Thus, for a 0.1-volt ohmic loss, a 0.8-volt total polarization loss (at the anode and cathode), and a 5% corrosion loss, the total amount of heat which must be carried away by the anolyte 11 amounts to about 1 electron-volt/electron or about 23 kilocalories/Faraday.

Part of the heat carried away by the anolyte will be expelled together with the excess electrolyte rejected from the anolyte-rejection chamber. For instance, if the LiOH concentration is to be maintained at 2 M and the anolyte gains 10° C. as it passes through the cell-stack, then the portion of anolyte expelled carries away 5 kilocalories/mole of lithium consumed, which reduces the required heat-exchange capacity by about 20%.

The reactive metal supply may be either in form of particles ready for introduction into the afore-discussed metering device 4 or it may be in substantially solid form, e.g., in the form of a ribbon leading to a slicer or other appropriate comminuting device (not shown).

Referring back to FIG. 1, the total thickness per single cell need not exceed about 1 cm (2 mm maximum wall thickness between adjacent back-to-back cells plus a 5-mm anolyte gap including anode current collecting screen(s), a 0.5 mm maximum separator thickness, a 0.5 mm cathode thickness, and a 2 mm hydrogen chamber thickness). Thus, for an output of at least 1 volt/cell at a current density of 0.5 ampere/cm$^2$ of apparent surface area, the apparent electrode area required for a 20-kilowatt power source amounts to 40,000 cm$^2$. Hence, the required cell-stack size is about 40,000 cm$^3$ or 0.04 m$^3$, excluding the end walls and electrolyte and hydrogen channels. Allowing for all of these, the total stack size for a 20-kilowatt power source need not exceed 0.08 m$^3$ or about 3 cubic feet.

In comparison, the size of the reactant supply for a 150-hour trip requiring a continuous average power of 20 kilowatts may be approximately 1 m$^3$ or nearly 40 cubic feet. The size of the reactant supply may thus be an order of magnitude larger than that of the second largest component of the system of FIG. 2. This demonstrates the major advantage of the system disclosed here over the previously known lithium-water battery. In that system, the size and weight of the battery components other than the lithium anodes must be several times larger than those of the anodes. The embodiment of FIG. 2 can thus be seen to yield savings in overall size and weight of more than an order of magnitude over the previously known lithium-water batteries of comparable energy capacity.

The main reason for these savings in overall size and weight is that the casing in conventional batteries must increase nearly in proportion to the size of the anodes, whereas in the system of FIG. 2, the size and weight of the cell-stack and of other ancillary components is nearly independent of the amount of required reactants. The latter can be stored in a fairly light expansible and collapsible container made of fairly thin flexible water-impervious material whose weight and volume are small in comparison with those of the reactants.

The afore-disclosed embodiment also has a far greater flexibility than the previously known lithium-water batteries, as a conventional battery designed for a long trip is too heavy and large for trips of shorter duration, and yet it may not have sufficient capacity for trips longer than it was originally designed for. In contrast, the system of FIG. 2 can be adapted to trips of various lengths by merely altering the amounts of reactants stored in the expansible supply 2.

Figure 3:
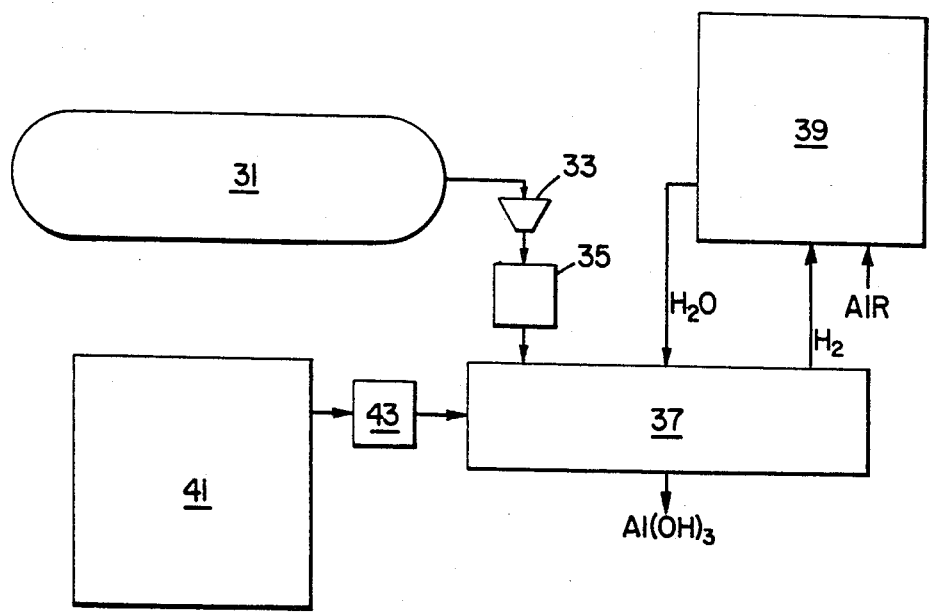
FIG. 3 is a block diagram of a power source system according to an alternative embodimet of the invention.

An alternative embodiment of my invention indicated by the block diagram of FIG. 3 is preferred for the propulsion of ground-based electric vehicles and for other ground-based applications. The preferred reactant here comprises particles of inexpensive grades of aluminum, such as those derived from aluminum refuse or of other inexpensive reactive metals. These particles are fed from their container bag 31 through a hopper 33 and a metal-metering device 35 into a slurry-type aluminum-water power system 37 comprising aluminum-water reactor cells 1 in a reactor cell-stack 21 similar to those of FIGS. 1 and 2. Power system 37 also comprises a slurry-electrolyte-circulation and Al(OH)$_3$-precipitate-removal system similar to that disclosed in FIG. 1 of my afore-cited copending U.S. application Ser. No. 179,274, filed Aug. 18, 1980, and incorporated herein by reference, except that the aluminum-air battery 20 of said reference is replaced here by the aluminum-water cell-stack 21 of FIG. 2.

The hydrogen generated by power system 37 is preferably fed to an alkaline hydrogen-air fuel cell, and the water formed by the electro-oxidation of the hydrogen is returned from fuel cell 39 to power system 37, where it can be utilized for the rinsing of the Al(OH)$_3$ reaction product and for the aluminum-water reaction. Additional water to satisfy the stoichiometric requirements for the latter reaction is drawn from a water supply 41 through a water-metering means 43 into the power system 37.

The embodiment of FIG. 3 has several substantial advantages over the previously disclosed aluminum-air power sources. First of all, in this embodiment, there is no contact between dissolved Al(OH)₃ or impurites introduced with the consumed aluminum and the air cathodes of fuel cell 39. Since the Al(OH)₃ or related impurities cause a shortening of the lifetime of the air cathodes in aluminum-air batteries, the system of FIG. 3 has an intrinsically longer lifetime and improved reliability. Secondly, fuel cell 39 can operate at substantially higher temperatures than the maximum temperatures allowable in most metal-air batteries, which results in reduced air-cathode polarization and a reduced size of the heat-exchange apparatus required to remove the generated heat. Thirdly, any losses due to corrosion of aluminum by the electrolyte in the reactor cell 1 are less critical than similar losses in aluminum-air cells, as the voltage output of the latter cells is about twice that of cell 1, and the hydrogen formed by the corrosion reaction is collected from cell 1 and fed to the fuel cell.

The embodiment of FIG. 3 also compares favorably with alternative fuel cell systems considered for electric vehicle propulsion. For instance, as compared with a methanol-consuming fuel cell system, this embodiment offers substantial cost savings. In the first place, the required fuel cell power and size are reduced approximately in half for the same total power demand, as nearly half of the required power is supplied by the aluminum-water power system 37. Secondly, the hydrogen generated by this system is sufficiently pure to be consumable in an alkaline fuel cell, which yields a higher cell voltage and uses less expensive cathode catalysts than the acid fuel cells required with carbonaceous fuels. Thirdly, both the cathode and anode of the metal-water reactor cell 1 can operate at much higher current densities than the air cathodes in fuel cells. Hence, the combined size and weight of fuel cell 39 and cell-stack 21 are substantially less than those of an acid fuel cell of comparable power.

There will now be obvious to those skilled in the art many modifications and variations of the afore-disclosed embodiments which, however, will remain within the scope of my invention if defined by the following claims:

I claim:

1. In a method of genreating electric power from the electro-chemical consumption of a reactive metal at an anode and water at a cathode, with evolution of hydrogen at the (a) cathode, the improvements which comprise (passing) bringing a slurry of reactive metal particles suspended in an electrolyte solution (past) in contact with a substantially inert anode current collector, storing reactive metal particles apart from said electrolyte solution, and feeding said particles to said slurry upon demand, wherein the major constituents of said reactive metal particles appertain to the family of metals or alloys comprised of aluminum, lithium, sodium, magnesium or calcium.

2. The method of claim 1, wherein said metal particles contain aluminum and/or lithium.

3. The method of claim 2, wherein said particles contain lithium and aluminum, and wherein the ratio of lithium to aluminum is such as to yield an effective average density of all the stored reactants and of any other substances depleted together with said reactants which is substantially equal to that of sea-water.

4. The method of claim 1, which comprises feeding the hydrogen evolving from said cathode to a fuel cell, a hydrogen-nickel oxide battery or a metal hydride storage device.

5. The method of claim 4, wherein said fuel cell is alkaline and depolarized by oxygen or by hydrogen peroxide.

6. The method of claim 5, wherein the water generated by said fuel cell is returned to said electrolyte solution.

7. The method of claim 1, which comprises feeding metered amounts of reactive metal particles and of water in predetermined proportions into one or more electrochemical cells.

8. The method of claim 1, wherein said feeding operation is actuated whenever the voltage of said cell or cells falls below a preset value or when the power demand exceeds what can be delivered by said cell or cells at a given time.

9. The method of claim 1, wherein said reactive metal particles are stored in an expansible and collapsible container.

10. The method of claim 7, which comprises circulating said electrolyte solution through said electrochemical cell or cells and through a heat exchanger to remove the excess heat generated by said electrochemical reaction.

11. The method of claim 10, which comprise removing from said cell or cells amounts of electrolyte solution enriched with the oxide or hydroxide product of said reactive metal particles, said amounts being approximately equal or proportional to the amounts of water fed into said cell or cells.

12. The method of claim 1, wherein said reactive metal particles are made from a macroscopically uniform alloy mixture.

13. The method of claim 1, wherein said reactive metal particles have a specific gravity comparable to or lower than that of said electrolyte solution, and wherein said slurry is caused to flow through said cell in a downward direction.

14. The method of claim 1, wherein said reactive metal particles are elongated in one or two dimensions.

15. The method of claim 14, wherein said particles are in form of flat flakes or chips.

16. The method of claim 15, wherein said particles are 1 to 3 mm long, 0.1 to 1 mm wide, and 10 to 100 microns thick.

17. The method of claim 2, wherein said electrolyte solution contains between 2 and 5 moles/liter of LiOH.

18. The method of claim 12, wherein said macroscopically uniform mixture is obtained by quenching a melt of the desired average alloy composition into solid ribbons or pellets and breaking up said ribbons or pellets, if necessary, into finer particles.

* * * * *